Patented Dec. 13, 1938

2,140,340

UNITED STATES PATENT OFFICE 2,140,340

PRODUCTION OF GRANULAR FERTILIZERS

Friedrich Vogel, Mannheim, Germany, assignor to I. G. Farbenindustrie Aktiengesellschaft, Frankfort-on-the-Main, Germany No Drawing. Application March 28, 1936, Serial No. 71,453. In Germany April 6, 1935

3 Claims. (Cl. 71—61)

This invention relates to the production of granular fertilizers of great value from ammonium sulphate or ammonium chloride or both salts and dolomite.

It has already been proposed to prepare granular fertilizers from moistened mixtures of calcium carbonate or other alkaline earth metal carbonates and ammonium chloride, preferably with additions of binding agents, as for example clay, by rolling or shaking movement and subsequent drying. When employing ammonium sulphate and limestone, nitrogen is lost probably by a reaction between the components by reason of which gypsum is formed and ammonia escapes. For this reason fertilizers of the last-mentioned kind have hitherto found practically no employment.

I have now found that fine-grained ammonium chloride or ammonium sulphate can be readily converted into the form of hard granules by mixing them alone or in admixture with each other with finely powdered calcium carbonate together with magnesium carbonate, preferably in a molecular ratio between about 2:1 and about 1:2, in particular with finely pulverized dolomite, the mixture then being granulated in a moist form. Dolomite powder in admixture with either ammonium chloride or ammonium sulphate or both may be readily granulated, i. e. without the use of a special binding agent and practically without loss of nitrogen; the grains of the granulated mixture are especially hard. Only very slight amounts of dusty constituents are formed during the granulation; this offers considerable technical advantages.

Mixtures consisting of from about 40 per cent to about 85 per cent by weight of ammonium salt and of from about 15 to about 60 per cent of the carbonates are well suitable.

The following examples will further illustrate the nature of this invention but the invention is not restricted to these examples. The parts are by weight.

Example 1

75 parts of fine-grained ammonium sulphate are intimately mixed with 25 parts of finely powdered dolomite which passes wholly through a sieve having meshes 0.3 millimetre in width. The mixture is moistened with about 6 parts of water and then granulated in a rotary tubular furnace. A product is formed containing 15.8 per cent of nitrogen and consisting mainly of very strong granules. It contains only about 7 per cent of constituents having a diameter of less than 0.6 millimetre so that it constitutes a material ready for use without sieving out the finer constituents. The evolution of ammonia during the preparation of the product is scarcely noticeable.

Example 2

63 parts of fine-grained ammonium chloride are intimately mixed with 37 parts of finely powdered dolomite which passes wholly through a sieve having meshes 0.3 millimetre wide. The mixture is moistened with about 6 parts of water and then granulated in a rotary tubular furnace. A production is formed containing 15.0 per cent of nitrogen and consisting mainly of very strong granules. It contains only 8 per cent of constituents having a diameter of less than 0.6 millimetre. In this case also, the evolution of ammonia during the preparation of the product is scarcely noticeable.

The particularly great hardness of the products obtainable according to this invention may be seen from a comparison with corresponding granulated products prepared from natural limestone ground to the same degree of fineness as the dolomite.

| Diameter of granules in millimetres | Average disintegration pressure | |
| --- | --- | --- |
| | 75 percent of ammonium sulphate 25 percent of dolomite (Example 1) | 75 percent of ammonium sulphate 25 percent of limestone |
| | Grams | Grams |
| 1.0 to 2.0 | 756.0 | 592.5 |
| 2.46 to 3.33 | 1578.0 | 1069.5 |

| | 63 percent of ammonium chloride 37 percent of dolomite (Example 2) | 63 percent of ammonium chloride 37 percent of limestone |
| --- | --- | --- |
| | Grams | Grams |
| 1.0 to 2.0 | 1049.3 | 593.5 |
| 2.46 to 3.33 | 2044.0 | 899.5 |

From the above comparison, giving the average of ten experiments in each case, it may be clearly seen that the fertilizers prepared with dolomite are greatly superior.

What I claim is:

1. Process for the production of granular mixed fertilizers comprising tumbling in a rotary receptacle a moist composition of from about 15 to about 60 per cent by weight of a mixture of calcium carbonate and magnesium carbonate in a molecular ratio between about 2:1 and about 1:2 with from about 85 to about 40 per cent by weight of ammonium chloride and water sufficient to moisten the composition and to effect granulation thereof.

2. Process for the production of granular mixed fertilizers comprising tumbling in a rotary receptacle a moist composition of from about 15 to about 60 per cent by weight of dolomite with from about 85 to about 40 per cent by weight of ammonium chloride and water sufficient to moisten the composition and to effect granulation thereof.

3. Process for the production of granular mixed fertilizers consisting in tumbling in a rotary receptacle 37 parts of finely powdered dolomite with 63 parts of fine-grained ammonium chloride and about 6 parts of water and granulating this mixture in a rotary tubular furnace.

FRIEDRICH VOGEL.